US012106730B2

(12) United States Patent
Shiibayashi

(10) Patent No.: US 12,106,730 B2
(45) Date of Patent: Oct. 1, 2024

(54) LADDER RESISTOR CIRCUIT HAVING CORRECTION RESISTORS, AND A CORRESPONDING DISPLAY DRIVER AND DISPLAY DEVICE

(71) Applicant: LAPIS Technology Co., Ltd., Yokohama (JP)

(72) Inventor: Kenichi Shiibayashi, Yokohama (JP)

(73) Assignee: LAPIS TECHNOLOGY CO., LTD., Yokohama (JP)

( * ) Notice: Subject to any disclaimer, the term of this patent is extended or adjusted under 35 U.S.C. 154(b) by 0 days.

(21) Appl. No.: 18/167,231

(22) Filed: Feb. 10, 2023

(65) Prior Publication Data

US 2023/0260476 A1 Aug. 17, 2023

(30) Foreign Application Priority Data

Feb. 14, 2022 (JP) ................................ 2022-020260

(51) Int. Cl.
*G09G 3/36* (2006.01)

(52) U.S. Cl.
CPC ..... *G09G 3/3696* (2013.01); *G09G 2310/027* (2013.01); *G09G 2310/0291* (2013.01); *G09G 2320/0276* (2013.01)

(58) Field of Classification Search
CPC ..... G09G 3/2092–2096; G09G 3/3275; G09G 3/36–3696; G09G 2310/0243; G09G 2310/0264–027; G09G 2310/0289–0294; G09G 2320/0233; G09G 2320/0271–0276; G09G 2330/028
See application file for complete search history.

(56) References Cited

U.S. PATENT DOCUMENTS

| | | | | |
|---|---|---|---|---|
| 6,304,255 | B1 * | 10/2001 | Suzuki | G09G 3/3696 345/215 |
| 2005/0012700 | A1 * | 1/2005 | Hara | G09G 3/3696 345/89 |
| 2007/0120792 | A1 * | 5/2007 | Sasaki | G09G 3/3696 345/89 |
| 2013/0249969 | A1 * | 9/2013 | Jeon | G09G 5/10 345/99 |

FOREIGN PATENT DOCUMENTS

| | | |
|---|---|---|
| JP | 2007-148151 A | 6/2007 |

* cited by examiner

*Primary Examiner* — Keith L Crawley
(74) *Attorney, Agent, or Firm* — Rabin & Berdo. P.C.

(57) ABSTRACT

A ladder resistor circuit includes a ladder resistor including first to k-th resistors connected in series and outputting a plurality of voltages by receiving a first potential and a second potential, a first correction resistor that has a resistance value equal to a series total resistance value of a resistor group constituted of first to r-th resistors among the first to k-th resistors, a second correction resistor that has a resistance value equal to a series total resistance value of a resistor group constituted of (r+1)-th to k-th resistors, and an amplifier that receives a potential of a connection point between the first and second correction resistors at an input terminal thereof, and has an output terminal thereof connected to a connection point between the r-th and (r+1)-th resistors.

12 Claims, 5 Drawing Sheets

LADDER RESISTOR CIRCUIT HAVING CORRECTION RESISTORS, AND A CORRESPONDING DISPLAY DRIVER AND DISPLAY DEVICE

CROSS REFERENCE TO RELATED APPLICATION

This application is based upon and claims the benefit of priority of the prior Japanese Patent Application No. 2022-020260, filed on Feb. 14, 2022, the entire contents of which are incorporated herein by reference.

TECHNICAL FIELD

The present invention relates to a ladder resistor circuit, a display driver including a ladder resistor circuit, and a display device.

BACKGROUND ART

A liquid crystal display panel, for example, includes a plurality of gate lines extending in the horizontal direction of the two-dimensional screen, a plurality of source lines extending in the vertical direction of the two-dimensional screen, a source driver that applies a driving voltage corresponding to a video signal to each source line, and a gate driver that applies a gate voltage to each gate line.

The source driver includes a DA (digital-to-analog) conversion circuit that converts a digital video signal to a driving voltage having an analog voltage value. This DA conversion circuit produces a plurality of gradation voltages (64, for example) with differing voltage values, respectively, that address the entire luminance range that the video signal can represent, selects a gradation voltage corresponding to the luminance level of the video signal from among the plurality of gradation signals, and outputs this gradation signal as a driving voltage.

The DA conversion circuit is equipped with a gamma correction circuit that generates gamma-corrected voltages as the plurality of gradation voltages based on the gamma characteristics of a display panel to be driven (see Japanese Patent Application Laid-open publication No. 2007-148151, for example).

The gamma correction circuit of Japanese Patent Application Laid-open publication No. 2007-148151 includes a gamma reference voltage generation circuit and a gamma correction voltage generation circuit. The gamma reference voltage generation circuit generates a plurality of gamma reference voltages by dividing the power supply voltage by the first ladder resistor. The gamma correction voltage generation circuit includes the second ladder resistor, and receives the plurality of gamma reference voltages generated by the gamma reference voltage generation circuit at prescribed connection points selected from among a plurality of connection points between respective resistors in the second ladder resistor. As a result, the gamma correction voltage generation circuit outputs a voltage generated at one end of each resistor in the second ladder resistor as a gamma correction voltage corresponding to the gradation voltage.

SUMMARY OF THE INVENTION

Problems to be Solved by the Invention

In some large display panels, the source driver is constituted of a plurality of semiconductor IC (integrated circuit) chips. Also, in recent years, in order to reduce the number of parts of the display panel, it is desired to integrate the gamma reference voltage generation circuit and the gamma correction voltage generation circuit as described in Patent Document 1 Japanese Patent Application Laid-open Publication No. 2007-148151 into each semiconductor IC chip.

However, due to manufacturing variations and the like, the amount of error in the resistance values of the ladder resistors included in the gamma reference voltage generation circuit and the gamma correction voltage generation circuit may differ between the respective semiconductor IC chips. This can cause respective regions in one screen to have differing luminance levels, based on the semiconductor IC chips driving the display operation for those regions, resulting in degradation of the image quality.

In particular, the ladder resistors included in the gamma reference voltage generation circuit described in Japanese Patent Application Laid-open Publication No. 2007-148151 generate a plurality of gamma reference voltages by receiving a single power supply voltage from the outside of the semiconductor IC chip, and divide the power supply voltage by a large number of resistors connected in series. Thus, as the number of resistors increases, the amount of error in each resistance value becomes greater, and because voltage values of the gamma reference voltage representing the same luminance level differ from each other, the image quality degrades.

One possible solution to this problem is to supply an intermediate potential of the power supply voltage from the outside, in addition to the single power supply voltage, and apply this intermediate potential to one end of a resistor connected at the intermediate position of the resistor group constituting the ladder resistor to reduce the amount of the error.

However, because it is necessary to provide a power supply circuit for generating the intermediate voltage outside the semiconductor IC chip in addition to the power supply circuit for generating the single power supply voltage, there arises a problem of an increased device size.

In view of this situation, the present invention aims at providing a ladder resistor circuit capable of reducing an output voltage error associated with an error in resistance value caused by manufacturing variations without increasing the circuit size, and a display driver and a display device capable of suppressing image quality degradation.

A ladder resistor circuit of the present invention includes: a ladder resistor that includes first to k-th (k is an integer of 2 or greater) resistors connected in series and that outputs a plurality of voltages obtained by dividing a voltage between a first potential and a second potential differing from the first potential by receiving the first potential at one end of the first resistor through a first node and the second potential at one end of the k-th resistor through a second node; a first correction resistor having one end connected to the first node; a second correction resistor having one end connected to the second node and the other end connected to the other end of the first correction resistor; and an amplifier that receives, at an input terminal thereof, a potential of a connection point between the first correction resistor and the second correction resistor, and that has an output terminal thereof connected to a connection point between an r-th (r is an integer of at least 2 but less than k) resistor and an (r+1)-th resistor among the first to k-th resistors.

Alternatively, a ladder resistor circuit of the present invention includes: a ladder resistor that includes first to k-th (k is an integer of 2 or greater) resistors connected in series and that outputs a plurality of voltages obtained by dividing a voltage between a first potential and a second potential differing from the first potential by receiving the first potential at one end of the first resistor through a first node and the second potential at one end of the k-th resistor through a second node; first to y-th (y is an integer of at least 3 but less than k) correction resistors connected to each other in series, the first to y-th correction resistors being connected between the first node and the second node; first to (y-1)-th amplifiers that each receive, at an input terminal thereof, a potential of each connection point between respective resistors among the first to y-th correction resistors, and that each have an output terminal thereof connected to each connection point between respective resistor groups among first to y-th resistor groups each including a plurality of resistors connected in series, the first to y-th resistor groups being formed by dividing first to k-th resistors into a y-number of groups.

A display driver of the present invention includes: a gradation voltage generation circuit that generates a plurality of gradation voltages corresponding to respective luminance levels for a luminance range that a video signal can represent, based on a plurality of reference voltages having differing voltage levels, the display driver selecting a gradation voltage corresponding to a luminance level represented by a video signal from among the plurality of gradation voltages and sending a driving signal having the selected gradation voltage to a display panel, wherein the gradation voltage generation circuit includes: a ladder resistor that includes first to k-th (k is an integer of 2 or greater) resistors connected in series and that outputs a plurality of voltages obtained by dividing a voltage between a first potential and a second potential differing from the first potential by receiving the first potential at one end of the first resistor through a first node and the second potential at one end of the k-th resistor through a second node; a first correction resistor having one end connected to the first node; a second correction resistor having one end connected to the second node and the other end connected to the other end of the first correction resistor; and an amplifier that receives, at an input terminal thereof, a potential of a connection point between the first correction resistor and the second correction resistor, and that has an output terminal thereof connected to a connection point between an r-th (r is an integer of at least 2 but less than k) resistor and an (r+1)-th resistor among the first to k-th resistors.

Alternatively, a display driver of the present invention includes a gradation voltage generation circuit that generates a plurality of gradation voltages corresponding to respective luminance levels for a luminance range that a video signal can represent, based on a plurality of reference voltages having differing voltage levels, the display driver selecting a gradation voltage corresponding to a luminance level represented by a video signal from among the plurality of gradation voltages and sending a driving signal having the selected gradation voltage to a display panel, wherein the gradation voltage generation circuit includes: a ladder resistor that includes first to k-th (k is an integer of 2 or greater) resistors connected in series and that outputs a plurality of voltages obtained by dividing a voltage between a first potential and a second potential differing from the first potential by receiving the first potential at one end of the first resistor through a first node and the second potential at one end of the k-th resistor through a second node; first to y-th (y is an integer of at least 3 but less than k) correction resistors connected to each other in series, the first to y-th correction resistors being connected between the first node and the second node; first to (y-1)-th amplifiers that each receive, at an input terminal thereof, a potential of each connection point between respective resistors among the first to y-th correction resistors, and that each have an output terminal thereof connected to each connection point between respective resistor groups among first to y-th resistor groups each including a plurality of resistors connected in series, the first to y-th resistor groups being formed by dividing first to k-th resistors into a y-number of groups.

A display device of the present invention includes: a display panel; and a display driver that includes a gradation voltage generation circuit that generates a plurality of gradation voltages corresponding to respective luminance levels for a luminance range that a video signal can represent, based on a plurality of reference voltages having differing voltage levels, the display driver selecting a gradation voltage corresponding to a luminance level represented by a video signal from among the plurality of gradation voltages and sending a driving signal having the selected gradation voltage to a display panel, wherein the gradation voltage generation circuit includes: a ladder resistor that includes first to k-th (k is an integer of 2 or greater) resistors connected in series and that outputs a plurality of voltages obtained by dividing a voltage between a first potential and a second potential differing from the first potential by receiving the first potential at one end of the first resistor through a first node and the second potential at one end of the k-th resistor through a second node; a first correction resistor having one end connected to the first node; a second correction resistor having one end connected to the second node and the other end connected to the other end of the first correction resistor; and an amplifier that receives, at an input terminal thereof, a potential of a connection point between the first correction resistor and the second correction resistor, and that has an output terminal thereof connected to a connection point between an r-th (r is an integer of at least 2 but less than k) resistor and an (r+1)-th resistor among the first to k-th resistors.

Alternatively, a display device of the present invention includes: a display panel; and a display driver that includes a gradation voltage generation circuit that generates a plurality of gradation voltages corresponding to respective luminance levels for a luminance range that a video signal can represent, based on a plurality of reference voltages having differing voltage levels, the display driver selecting a gradation voltage corresponding to a luminance level represented by a video signal from among the plurality of gradation voltages and sending a driving signal having the selected gradation voltage to a display panel, wherein the gradation voltage generation circuit includes: a ladder resistor that includes first to k-th (k is an integer of 2 or greater) resistors connected in series and that outputs a plurality of voltages obtained by dividing a voltage between a first potential and a second potential differing from the first potential by receiving the first potential at one end of the first resistor through a first node and the second potential at one end of the k-th resistor through a second node; first to y-th (y is an integer of at least 3 but less than k) correction resistors connected to each other in series, the first to y-th correction resistors being connected between the first node and the second node; first to (y-1)-th amplifiers that each receive, at an input terminal thereof, a potential of each connection point between respective resistors among the first to y-th correction resistors, and that each have an output terminal thereof connected to each connection point between respective resistor groups among first to y-th resistor groups each including a plurality of resistors connected in series, the first to y-th resistor groups being formed by dividing first to k-th resistors into a y-number of groups.

A ladder resistor circuit of the present invention includes a ladder resistor that has the first to k-th resistors connected in series and that outputs a plurality of voltages by dividing a voltage between the first potential and the second potential respectively received through the first and second nodes, and the ladder resistor is equipped with an error correction circuit described in the following.

The error correction circuit includes the first and second correction resistors for dividing a voltage between the first and second potentials, and applies through an amplifier an intermediate potential, which is the potential divided by the first and second correction resistors, to the connection point between the r-th resistor and the (r+1)-th resistor among the first to k-th resistors constituting the ladder resistor.

The first correction resistor (second correction resistor) is a single resistor, and thus the amount of error in resistance value due to manufacturing variations is smaller than that of the series total resistance value of the first to r-th resistors (the (r+1)-th to k-th resistors). The first and second correction resistors respectively have resistance values set such that a ratio of those resistance values equals a ratio of the series total resistance value of the first to r-th resistors, to the series total resistance value of the (r+1)-th to k-th resistors, among the first to k-th resistors.

As a result, with the ladder resistor circuit of the present invention, it is possible to reduce the amount of error in respective voltages outputted from the ladder resistors, without providing an external power supply for producing the intermediate potential to be applied to the connection point between the resistors to correct errors in output voltages caused by an error that occurs in each of the ladder resistors due to manufacturing variations. In addition, by using the ladder resistor circuit of the present invention for a gradation voltage generation circuit in a display device, it is possible to achieve a display driver and a display device that can suppress degradation of image quality without increasing the device size.

DETAILED DESCRIPTION OF EMBODIMENTS

Below, embodiments of the present invention will be explained in detail with reference to figures.

Figure 1:
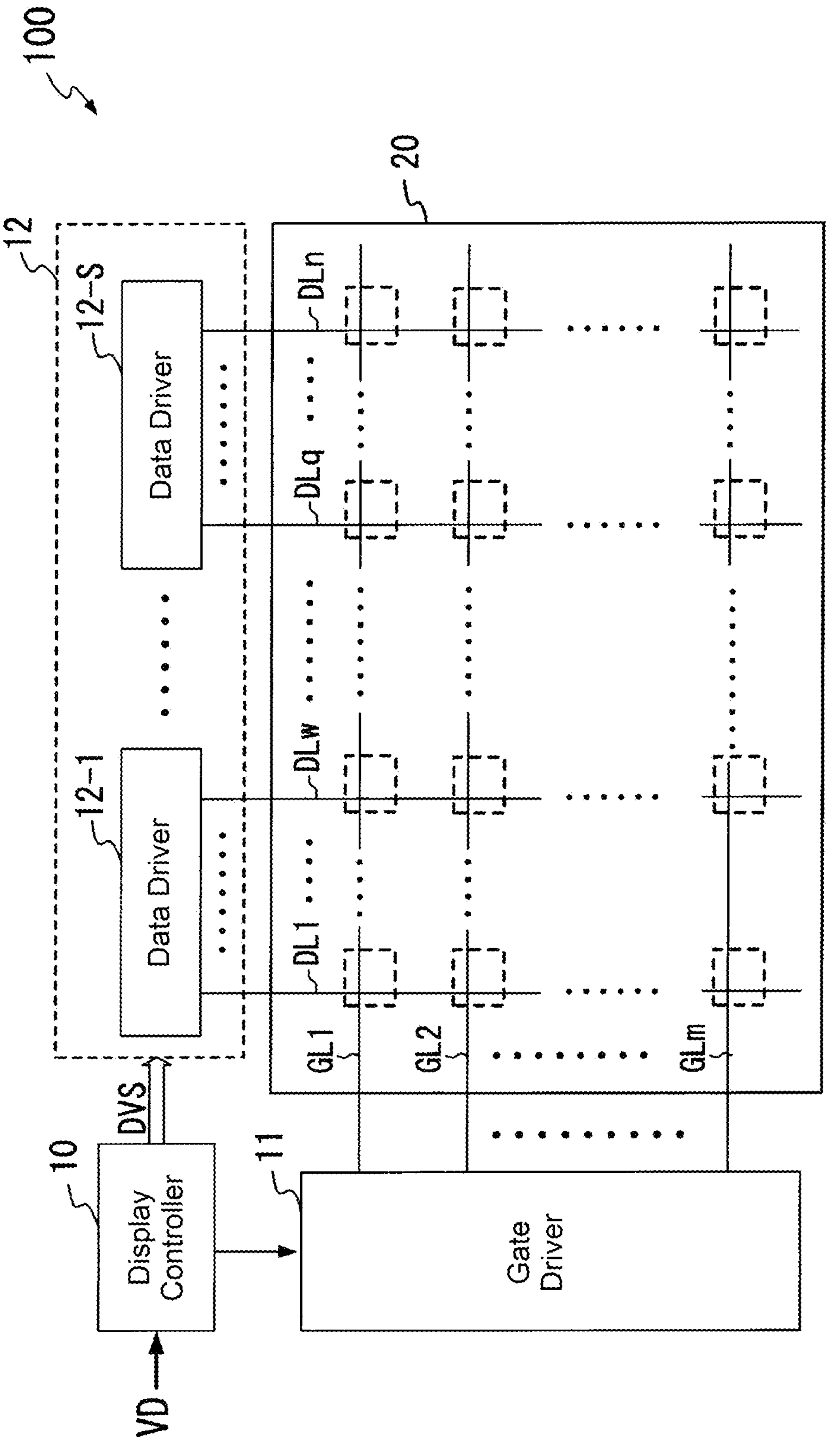
FIG. 1 is a block diagram illustrating a schematic configuration of a display device 100 including a display driver of the present invention.

FIG. 1 is a block diagram illustrating a schematic configuration of a display device 100 equipped with a display driver that includes a ladder resistor circuit of the present invention.

As illustrated in FIG. 1, the display device 100 includes a display controller 10 and a display panel 20 having a gate driver 11 and a data driver 12 connected thereto.

The display panel 20 is a liquid crystal display panel, for example, and has an m-number (m is a natural number of 2 or greater) of gate lines GL1 to GLm that extend in the horizontal direction of the two-dimensional screen, and an n-number (n is a natural number of 2 or greater) of data lines DL1 to DLn that extend in the vertical direction of the two-dimensional screen. Display cells (areas surrounded by the dashed lines) for displaying red, green, or blue are formed at the respective intersections of the gate lines GL1 to GLm and the data lines DL1 to DLn.

The display controller 10 receives a video signal VD, and supplies the gate driver 11 with a gate timing signal indicating the timing of applying a gate selection signal to each of the gate lines GL1 to GLm based on the video signal VD.

The display controller 10 also generates, based on the video signal VD, various control signals including a clock signal, a polarity reversal signal, and a synchronization signal, and a sequence of display data PD representing the luminance level of each pixel in digital values. The display controller 10 supplies the data driver 12 of the display panel 20 with a digital video signal DVS including those control signals and the sequence of display data PD.

The gate driver 11 sequentially generates a gate selection signal including at least one pulse for selecting a gate line according to the gate timing signal supplied from the display controller 10, and supplies the gate selection signal to each of the gate lines GL1 to GLm of the display panel 20.

The data driver 12 takes in the sequence of display data PD included in the video signal DVS for each horizontal scanning line (n pieces), and converts each display data PD into a pixel driving signal having an analog voltage value corresponding to the luminance level. Then, the data driver 12 supplies the generated n-number of pixel driving signals to the data lines DL1 to DLn of the display panel 20, respectively.

The data driver 12 is constituted of an S-number (S is an integer of 2 or greater) of data drivers 12-1 to 12-S, each included in an S-number of independent semiconductor IC chips.

The data drivers 12-1 to 12-S are provided for respective data line groups obtained by diving the data lines DL1 to DLn of the display panel 20 into groups of a w-number (w is an integer of 2 or greater) of data lines that are adjacent to each other. The data drivers 12-1 to 12-S have the same internal configuration as each other. The data driver 12-1, for example, supplies corresponding pixel driving signals to the w-number of data lines DL1 to DLw, among the data lines DL1 to DLn, respectively. The data driver 12-S supplies corresponding pixel driving signals to the w-number of data lines DLq (q is an integer of 2 or greater) to DLn, among the data lines DL1 to DLn, respectively.

Figure 2:
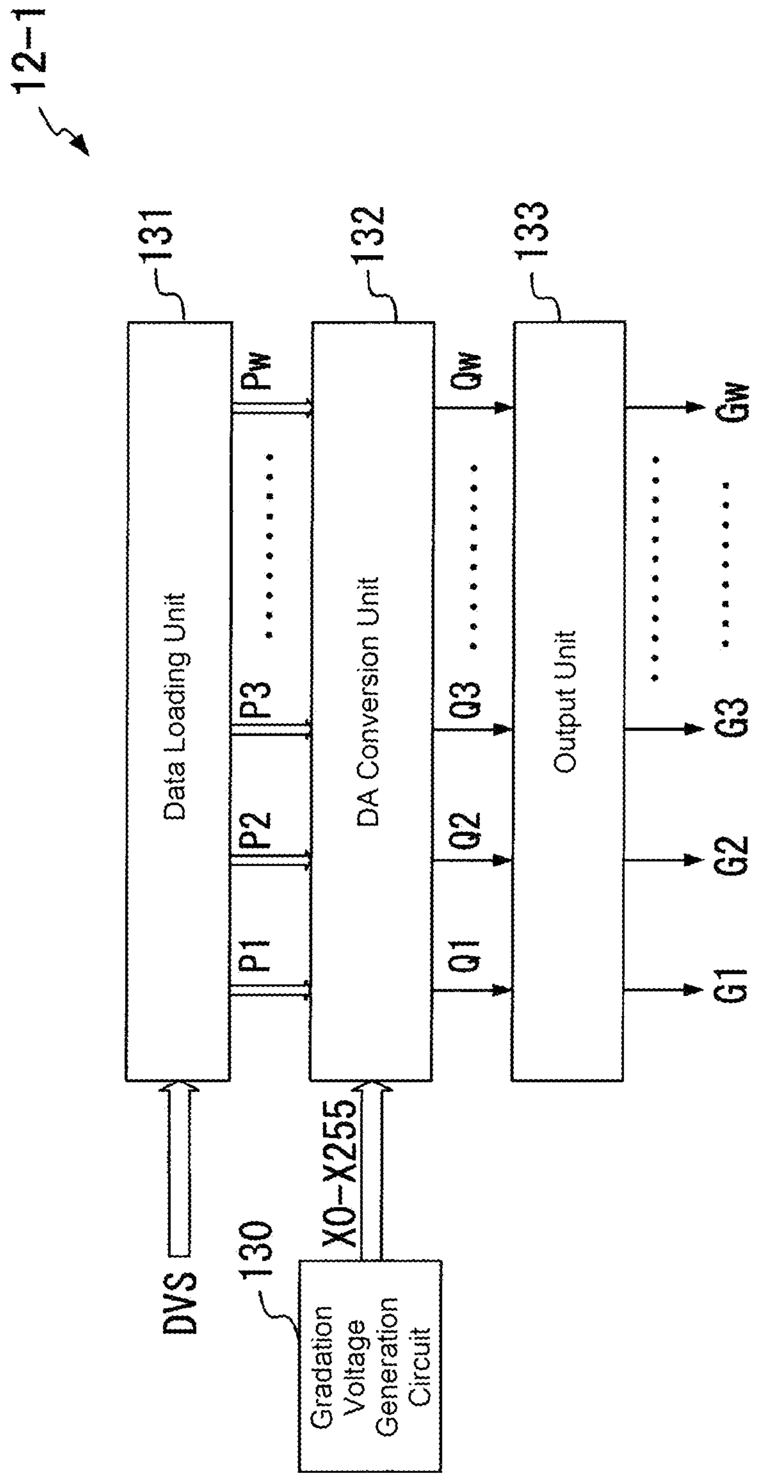
FIG. 2 is a block diagram illustrating an internal configuration of a data driver 12-1.

FIG. 2 is a block diagram schematically illustrating the internal configuration of the source driver 12-1 as a sample of the source drivers 12-1 to 12-S.

As illustrated in FIG. 2, the data driver 12-1 includes a gradation voltage generation circuit 130, a data loading unit 131, a DA conversion unit 132, and an output unit 133.

The gradation voltage generation circuit 130 generates gradation voltages X0 to X255 that have voltage values differing from each other to represent the range of the luminance levels that can be rendered by the video signal in 256 levels, for example. The gradation voltages are then supplied to the DA conversion unit 132.

The data loading unit 131 takes in the w-number of pieces of display data PD corresponding to the data lines DL1 to DLw from the sequence of the display data PD included in the video signal DVS for one horizontal scanning period, and supplies those pieces of data to the DA conversion unit 132 as display data P1 to Pw.

The DA conversion unit 132 converts the display data P1 to Pw into gradation voltage signals Q1 to Qw having analog voltage values using the gradation voltages X0 to X255. That is, the DA conversion unit 132 selects, for each of the display data P1 to Pw, a gradation voltage having a voltage value corresponding to the luminance level indicated by the display data P from among the gradation voltages X0 to X255. As a result, the DA conversion unit 132 obtains the gradation voltage signals Q1 to Qw each having a gradation voltage selected for each of the display data P1 to Pw. The DA conversion unit 132 supplies the gradation voltage signals Q1 to Qw to the output unit 133.

The output unit 133 outputs pixel driving signals G1 to Gw, which are obtained by amplifying the respective gradation voltage signals Q1 to Qw individually. That is, the output unit 133 of the data driver 12-1 outputs the pixel driving signals G1 to Gw, and supplies those signals to the data lines DL1 to DLw of the display panel 20, respectively.

Figure 3:
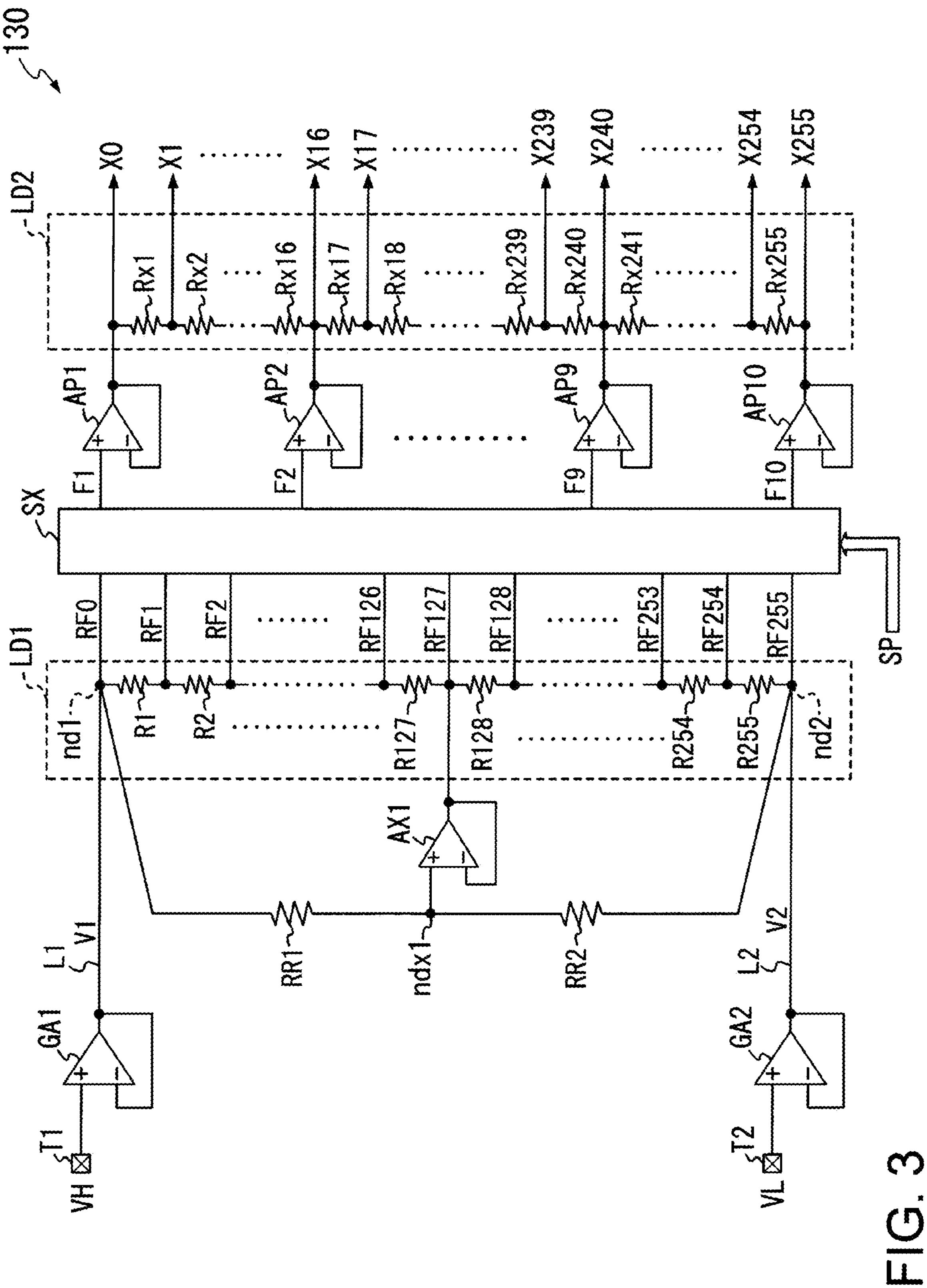
FIG. 3 is a circuit diagram showing an internal configuration of a gradation voltage generation circuit 130.

FIG. 3 is a circuit diagram illustrating the internal configuration of the gradation voltage generation circuit 130.

As illustrated in FIG. 3, the gradation voltage generation circuit 130 includes amplifiers GA1 and GA2, which are gamma buffer amplifiers for input, a ladder resistor LD2, γ-characteristic adjustment circuit SX, and amplifiers AP1 to AP10, which are gamma buffers for output. Furthermore, the gradation voltage generation circuit 130 also includes a ladder resistor LD1, an amplifier AX1, and resistors RR1 and RR2 that constitute the ladder resistor circuit of the present invention.

In FIG. 3, the amplifiers GA1, GA2, AP1 to AP10, and AX1 are each a voltage follower OP (operational) amplifier in which the inversion input terminal thereof is connected to its own output terminal, for example.

The amplifier GA1 receives, at its own non-inverted input terminal, the first power supply potential VH received through an external terminal T1 of a semiconductor IC chip, and outputs a potential obtained by amplifying the power supply potential VH from its own output terminal as the first potential V1, which is then applied to a line L1.

The amplifier GA2 receives, at its own non-inverted input terminal, the second power supply potential VL received through an external terminal T2 of a semiconductor IC chip, and outputs a potential obtained by amplifying the power supply potential VH from its own output terminal as the second potential V2, which is then applied to a line L2.

The ladder resistor LD1 includes resistors R1 to R255 connected in series. Among the resistors R1 to R255, one end of the resistor R1 connected at the outermost position is connected to a node nd1 on the line L1, and one end of the resistor R255 is connected to a node nd2 on the line L2.

With this configuration, the ladder resistor LD1 divides the voltage between the nodes nd1 and nd2, outputs 256 voltages, having voltage values differing from each other, as reference voltages RF0 to RF255 from one end of each of the resistors R1 to R255, and supplies those voltages to the γ-characteristic adjustment circuit SX.

Furthermore, between the line L1 and the line L2, an error correction circuit constituted of the resistors RR1 and RR2 connected in series and the amplifier AX1 is connected.

That is, as illustrated in FIG. 3, the resistor RR1 has one end connected to the node nd1 on the line L1, and the other end connected to one end of the resistor RR2 through a node ndx1. The other end of the resistor RR2 is connected to the node nd2 on the line L2.

The resistors RR1 and RR2 respectively have resistance values set such that a ratio of those resistance values equals a ratio of the series total resistance value of the resistors R1 to R127 to the series total resistance value of the resistors R128 to R255 in the ladder resistor LD1.

In the amplifier AX1, the non-inverted input terminal is connected to the node ndx1, which is the connection point between the resistor RR1 and the resistor RR2, and the output terminal is connected to the connection point between the resistor R127 and the resistor R128 in the ladder resistor LD1. With this configuration, the amplifier AX1 receives, at the non-inverted input terminal thereof, a potential (intermediate potential) obtained by dividing the voltage between the first potential V1 and the second potential V2 by the resistors RR1 and RR2, amplifies this intermediate potential, and applies this amplified potential to the connection point between the resistor R127 and the resistor R128.

The γ-characteristic adjustment circuit SX selects ten reference voltages having voltage values differing from each other from among the reference voltages RF0 to RF255, according to the γ-correction property indicated by γ-correction data SP. Then, the γ-characteristic adjusting circuit SX supplies the ten selected reference voltages as gamma reference voltages F1 to F10 to the non-inverted input terminals of the amplifiers AP1 to AP10, respectively.

The amplifiers AP1 to AP10 individually amplify the gamma reference voltages (F1 to F10) received at their respective non-inverted input terminals, and output those amplified potentials from their own output terminals.

The ladder resistor LD2 has resistors Rx1 to Rx255, which are 256 resistors connected in series, including the resistor Rx1 connected to the output terminal of the amplifier AP1 and the resistor Rx255 connected to the output terminal of the amplifier AP10.

The output terminals of the amplifiers AP2 to AP9 are connected to eight connection points among all the connection points of the respective resistors Rx1 to Rx255 connected to each other. For example, as illustrated in FIG. 3, the output terminal of the amplifier AP2 is connected to the connection point between the resistance Rx16 and the resistance Rx17, and the output terminal of the amplifier AP9 is connected to the connection point between the resistor Rx240 and the resistor Rx241.

The ladder resistor LD2 divides the voltage between the potential of the output terminal of the amplifier AP1 and the potential of the output terminal of the amplifier AP10, thereby outputting the gradation voltages X0 to X255, which are 256 voltages having voltage values differing from each other, from respective one ends of the resistors Rx1 to Rx255.

That is, the gradation voltages X0 to X255 representing the 256 luminance levels are outputted through the amplifiers AP1 to AP10 and the ladder resistor LD2 in accordance with desired gamma correction characteristics, As described above, in the gradation voltage generation circuit 130 illustrated in FIG. 3, the ladder resistor LD1 first divides the voltage between the two power supply potentials VH and VL supplied from the external power supply circuit (not shown) to generate the reference voltages RF0 to RF255.

Next, the γ-characteristic adjustment circuit SX selects ten representative voltages from among the reference voltages RF0 to RF255 as the gamma reference voltages F1 to F10 according to the desired gamma correction characteristics.

Then, the ladder resistor LD2 divides the voltage between the gamma reference voltages F1 and F10 while receiving the gamma reference voltages F2 to F9 as intermediate potentials to generate the gradation voltages X0 to X255 representing the 256 luminance levels.

Generally, in semiconductor IC chips including resistors, resistance values thereof may vary due to manufacturing variations and the like.

In particular, in a circuit like a ladder resistor circuit in which a plurality of resistors are connected in series, as the number of resistors connected after the node that receives a potential increases, the accumulated amount of errors in those resistors also increases. Thus, the amount of error of the voltage generated at one end of a resistor is greater when there are a relatively large number of resistors connected in series between that resistor and the node that receives the potential, as compared with a case in which a smaller number of resistors connected between the node and the resistor.

In view of this situation, the ladder resistor LD1 is provided with the error correction circuit constituted of the resistors RR1 and RR2 and the amplifier AX1 in order to reduce the amount of error in each of the reference voltages RF0 to RF255 caused by errors that occur in the resistance values of the resistors as a result of manufacturing variations.

Figure 4:
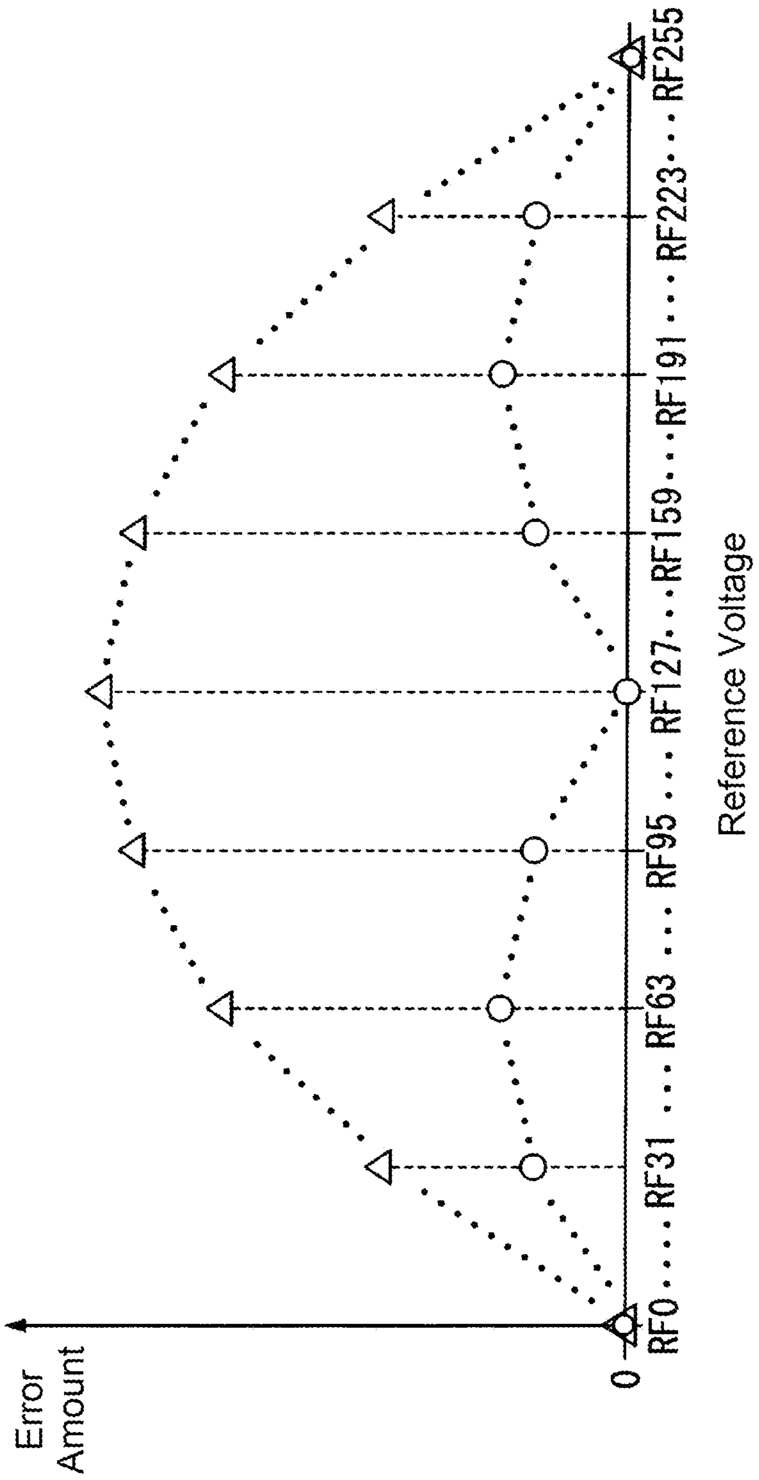
FIG. 4 is a diagram illustrating the amount of error relative to reference voltages RF0 to RF255 to show a comparison between a configuration with an error correction circuit and a configuration without an error correction circuit.

FIG. 4 a diagram illustrating the amount of error in the reference voltages RF0 to RF255 to show a comparison between a configuration with the error correction circuit (RR1, RR2, and AX1) and a configuration without the error correction circuit.

That is, when the error correction circuit is not provided, as indicated by the triangles in FIG. 4, the amount of error in each reference voltage increases gradually from the reference voltages RF0/RF255 to RF1/RF254, and then to RF2/RF253 . . . with the amount of error in the reference voltage RF0/RF255 being smallest. The reference voltage RF0 is the potential on the line L1 (L2) that receives the first potential V1 (V2).

On the other hand, when the error correction circuit (resistors RR1, RR2, amplifier AX1) is provided, the intermediate potential divided by the two error correction resistors RR1 and RR2 is applied to the connection point between the resistors R127 and R128 via the amplifier AX1.

The resistors RR1 and RR2 respectively have resistance values set such that a ratio of those resistance values equals a ratio of the series total resistance value of the resistors R1 to R127 to the series total resistance value of the resistors R128 to R255 in the ladder resistor LD1. Because the resistor RR1 (RR2) is a single resistor, the amount of error due to manufacturing variations is smaller than that of the total resistance value of the resistors R1 to R127 (R128 to R255).

That is, with the error correction circuit (RR1, RR2 and AX1), the intermediate potential obtained through the resistors RR1 and RR2, each of which is a single resistor having a smaller amount of error due to manufacturing variations as compared with the series total resistance value of the resistors R1 to R127 (R128 to R255), is applied to the connection point between the resistor R127 and the resistor R128 of the ladder resistor LD1.

Thus, when the ladder resistor LD1 is equipped with the error correction circuit (RR1, RR2, AX1), as indicated by the white circles in FIG. 4, the amount of error in each of the reference voltages RF0 to RF255 is smaller as compared to the case where the error correction circuit is not provided (i.e., triangles in FIG. 4).

Thus, according to the gradation voltage generation circuit 130 that uses a ladder resistor circuit constituted of the ladder resistor LD1 and the error correction circuit (RR1, RR2, AX1), it is possible to reduce the amount of error in the output voltage (RF0 to RF255) of each semiconductor IC chip caused by manufacturing variations without using a special external power supply for generating the intermediate potential. This makes it possible to suppress degradation of image quality due to manufacturing variations without increasing the device size of the data driver.

In the embodiment described above, the ladder resistance circuit (LD1, RR1, RR2, AX1) illustrated in FIG. 3 was used for the ladder resistor circuit of the gradation voltage generation circuit included in the data driver 12 of the display device 100, but may also be used for other purposes besides a driver of a display device.

Further, in the ladder resistor circuit of FIG. 3, the error correction circuit (RR1, RR2, AX1) applies the intermediate potential, which is one half of the potential between the first potential V1 and the second potential V2, to the connection point between the resistors R127 and R128 of the resistors R1 to R255 in the ladder resistor LD1. However, the intermediate potential is not limited to one half of the potential between the first potential V1 and the second potential V2, or the number of resistors connected in series in the ladder resistor LD1 is not limited to 255 either.

In summary, the ladder resistor circuit of the present invention may have any configurations as long as the ladder resistor, the first and second correction resistors, and the amplifier described below are included.

That is, the ladder resistor (LD1) includes the first to k-th (k is an integer of 2 or greater) resistors connected in series (such as R1 to R255). The ladder resistor (LD1) receives the first potential (V1) at one end of the first resistor (R1) through the first node (nd1), and receives the second potential (V2) differing from the first potential at one end of the k-th resistor (such as R255) through the second node (nd2), thereby outputting a plurality of voltages (such as RF0 to RF255) obtained by dividing the voltage between the first potential and the second potential.

The first correction resistor (RR1) has one end thereof connected to the first node (nd1), and the second correction resistor (RR2) has one end thereof connected to the second node (nd2) and the other end connected to the other end of the first correction resistor (RR1).

The first correction resistor (RR1) and the second correction resistor (RR2) respectively have resistance values set such that a ratio of those resistance values equals a ratio of the series total resistance value of the first to r-th (r is an integer of at least 2 but smaller than k) resistors to the series total resistance value of the (r+1)-th to k-th resistors.

The amplifier (AX1) receives, at the input terminal (non-inverted input terminal) thereof, the potential of the connection point between the first correction resistor and the second correction resistor, and has the output terminal thereof connected to the connection point between the r-th resistor and the (r+1)-th resistor.

Further, in the embodiment described above, the error correction circuit (RR1, RR2, AX1) applies a single intermediate potential, which is a fraction of the potential between the first potential V1 and the second potential V2, to one of the connection points between the respective resistors of the ladder resistor LD1. However, a plurality of intermediate potentials between the first potential V1 and the second potential V2 may also be applied to a plurality of connection points in the ladder resistor LD1, respectively.

Figure 5:
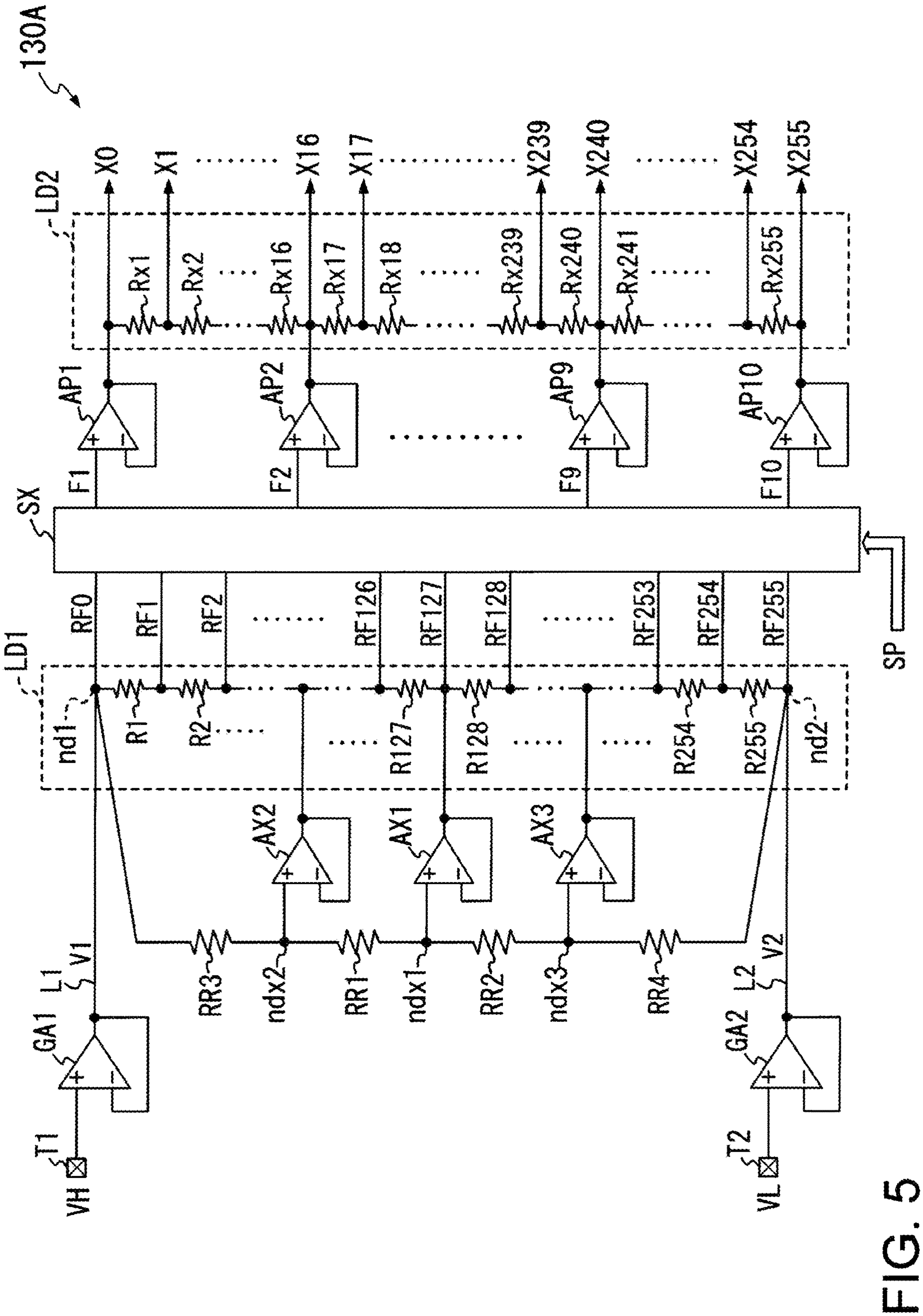
FIG. 5 is a circuit diagram showing an internal configuration of a gradation voltage generation circuit 130A.

FIG. 5 is a circuit diagram illustrating the configuration of a gradation voltage generation circuit 130A as a modification example of the gradation voltage generation circuit 130 including the ladder resistor circuit made in view of this point.

The configuration of the gradation voltage generation circuit 130A is the same as that illustrated in FIG. 3 except that resistors RR3 and RR4, and amplifiers AX2 and AX3 are newly added.

Thus, only the configurations of the resistors RR1 to RR4 and the amplifiers AX1 to AX3 constituting the error correction circuit of the gradation voltage generation circuit 130A will be explained below.

In FIG. 5, between the node nd1 on the line L1 and the node nd2 on the line L2, a series circuit constituted of the resistors RR3, RR1, RR2, and RR4, which are the correction resistors for the error correction circuit, is connected.

That is, as illustrated in FIG. 5, one end of the resistor RR3 is connected to the node nd1, the other end of the resistor RR3 is connected to one end of the resistor RR1, and the other end of the resistor RR1 is connected to one end of the resistor RR2. Furthermore, the other end of the resistor RR2 is connected to one end of the resistor RR4, and the other end of the resistor RR4 is connected to the node nd2 on the line L2.

The resistors RR3, RR1, RR2, and RR4 respectively have resistance values set such that the ratio of those resistance values equals a ratio of the following four values: the series total resistance value of the first resistor R1 to the t-th (t is an integer of at least 2 but not greater than 126) resistor R(t); the series total resistance value of the resistor R(t+1) to the resistor R127; the series total resistance value of the resistor R128 to the e-th (e is an integer of any one of 128 to 254) resistor R(e); and the series total resistance value of the resistor R(e+1) to the last resistor R255.

In the amplifier AX1, the non-inverted input terminal is connected to the node ndx1, which is the connection point between the resistor RR1 and the resistor RR2, and the output terminal is connected to the connection point between the resistor R127 and the resistor R128 in the ladder resistor LD1.

In the amplifier AX2, the non-inverted input terminal is connected to the connection point ndx2 between the resistor RR1 and the resistor RR3, and the output terminal is connected to the connection point between the resistor R(t) and the resistor R(t+1) in the ladder resistor LD1.

In the amplifier AX3, the non-inverted input terminal is connected to the connection point ndx3 between the resistor RR2 and the resistor RR4, and the output terminal is connected to the connection point between the resistor R(e) and the resistor R(e+1) in the ladder resistor LD1.

According to the gradation voltage generation circuit 130A employing the ladder resistor circuit (LD1, RR1 to RR4, AX1 to AX3) illustrated in FIG. 5, it is possible to reduce the amount of errors in a plurality of output voltages (RF0 to RF255) for each semiconductor IC chip associated with manufacturing variations, to a greater extent than employing the ladder resistor circuit (LD1, RR1, AX1) of FIG. 3.

In summary, the ladder resistor circuit illustrated in FIG. 5 may have any configurations as long as the following first to y-th (y is an integer of 3 or greater and less than k) correction resistors and first to (y−1)-th amplifiers are connected to a ladder resistor (LD1) including first to k-th (k is an integer of 2 or greater) resistors (such as R1 to R255) connected in series.

The ladder resistor (LD1) receives the first potential (V1) at one end of the first resistor (R1) through the first node (nd1), and receives the second potential (V2) differing from the first potential at one end of the k-th resistor (such as R255) through the second node (nd2), thereby outputting a plurality of voltages (RF0 to RF255) obtained by dividing the voltage between the first potential and the second potential.

The first to y-th correction resistors (such as RR1 to RR4) are connected to each other in series between the first node (nd1) and the second node (nd2).

The first to (y−1)-th amplifiers (such as AX1 to AX3) each receive, at the input terminal (non-inverted input terminal) thereof, the potential of each connection point between a plurality of resistors among the first to y-th correction resistors (such as RR1 to RR4). In each of the first to (y−1)-th amplifiers, an output terminal thereof is connected to each connection point between a plurality of resistor groups (the connection point between R(t) and R(t+1), the connection point between R127 and R128, and the connection point between R(e) and R(e+1), for example) out of the first to y-th resistor groups obtained by dividing the first to k-th resistors of the ladder resistor (LD1) into a γ-number of groups each constituted of a plurality of resistors connected to each other in series (R1 to R(t), R(t+1) to R127, R128 to R(e), and R(e+1) to R255, for example). The first to y-th correction resistors respectively have resistance values set such that a ratio of those resistance values equals a ratio of respective series total resistance values of the first to y-th resistor groups, respectively, which are obtained by dividing the plurality of resistors connected in series in the ladder resistor by y.

For example, the first correction resistor (such as RR3), the second correction resistor (such as RR1), the third correction resistor (such as RR2), and the fourth correction resistor (such as RR4) respectively have resistance values set such that a ratio of those resistance values equals a ratio of the following values: the series total resistance value of the first resistor group (such as R1 to R(t)); the series total resistance value of the second resistor group (such as R(t+1) to R127); the series total resistance value of the third resistor group (such as R128 to R(e)); and the series total resistance value of the fourth resistor group (such as R(e+1) to R255).

What is claimed is:

1. ) A ladder resistor circuit, comprising:

a ladder resistor that includes first to k-th (k is an integer of 2 or greater) resistors connected in series and that outputs a plurality of voltages obtained by dividing a voltage between a first potential and a second potential differing from the first potential by receiving the first potential at one end of the first resistor directly connected to a first node and the second potential at one end of the k-th resistor directly connected to a second node;

a first correction resistor having one end directly connected to the first node;

a second correction resistor having one end directly connected to the second node and another end directly connected to another end of the first correction resistor; and an amplifier that receives, at an input terminal thereof, a potential of a connection point between the first correction resistor and the second correction resistor, and that has an output terminal thereof connected to a connection point between an r-th (r is an integer of at least 2 but less than k) resistor and an (r+1)-th resistor among the first to k-th resistors;

wherein the first correction resistor and the second correction resistor respectively have resistance values set such that a ratio of the resistance values equals a ratio of a series total resistance value of the first to r-th resistors to a series total resistance value of the (r+1)-th to k-th resistors, among the first to k-th resistors; and wherein the r-th resistor and the (r+1)-th resistor are connected to a same node.

2. The ladder resistor circuit according to claim 1, wherein the amplifier is a voltage follower operational amplifier.

3. A display driver, comprising:

a gradation voltage generation circuit that generates a plurality of gradation voltages corresponding to respective luminance levels for a luminance range that a video signal can represent, based on a plurality of reference voltages having differing voltage levels, wherein the display driver selects a gradation voltage corresponding to a luminance level represented by a video signal among the plurality of gradation voltages, and sends a driving signal having the selected gradation voltage to a display panel, wherein the gradation voltage generation circuit includes:

a ladder resistor that includes first to k-th (k is an integer of 2 or greater) resistors connected in series and that outputs a plurality of voltages obtained by dividing a voltage between a first potential and a second potential differing from the first potential by receiving the first potential at one end of the first resistor directly connected to a first node and the second potential at one end of the k-th resistor directly connected to a second node;

a first correction resistor having one end directly connected to the first node;

a second correction resistor having one end directly connected to the second node and another end directly connected to another end of the first correction resistor; and an amplifier that receives, at an input terminal thereof, a potential of a connection point between the first correction resistor and the second correction resistor, and that has an output terminal thereof connected to a connection point between an r-th (r is an integer of at least 2 but less than k) resistor and an (r+1)-th resistor among the first to k-th resistors;

wherein the first correction resistor and the second correction resistor respectively have resistance values set such that a ratio of the resistance values equals a ratio of a series total resistance value of the first to r-th resistors to a series total resistance value of the (r+1)-th to k-th resistors, among the first to k-th resistors; and wherein the r-th resistor and the (r+1)-th resistor are connected to a same node.

4. The display driver according to claim 3, wherein the amplifier is a voltage follower operational amplifier.

5. The display driver according to claim 3, further comprising:

a first external terminal and a second external terminal;

a first buffer amplifier that amplifies a potential received at the first external terminal and applies the amplified potential to a first line as the first potential; and a second buffer amplifier that amplifies a potential received at the second external terminal and applies the amplified potential to a second line as the second potential.

6. A display device, comprising:

a display panel; and a display driver including a gradation voltage generation circuit that generates a plurality of gradation voltages corresponding to respective luminance levels for a luminance range that a video signal can represent, based on a plurality of reference voltages having differing voltage levels, the display driver selecting a gradation voltage corresponding to a luminance level represented by a video signal from among the plurality of gradation voltages and sending a driving signal having the selected gradation voltage to the display panel, wherein the gradation voltage generation circuit includes:

a ladder resistor that includes first to k-th (k is an integer of 2 or greater) resistors connected in series and that outputs a plurality of voltages obtained by dividing a voltage between a first potential and a second potential differing from the first potential by receiving the first potential at one end of the first resistor directly connected to a first node and the second potential at one end of the k-th resistor directly connected to a second node;

a first correction resistor having one end directly connected to the first node;

a second correction resistor having one end directly connected to the second node and another end directly connected to another end of the first correction resistor; and an amplifier that receives, at an input terminal thereof, a potential of a connection point between the first correction resistor and the second correction resistor, and that has an output terminal thereof connected to a connection point between an r-th (r is an integer of at least 2 but less than k) resistor and an (r+1)-th resistor among the first to k-th resistors;

wherein the first correction resistor and the second correction resistor respectively have resistance values such that a ratio of the resistance values equals a ratio of a series total resistance value of the first to r-th resistors to a series total resistance value of the (r+1)-th to k-th resistors among the first to k-th resistors; and wherein the r-th resistor and the (r+1)-th resistor are connected to a same node.

7. The ladder resistor circuit according to claim 1, wherein a number of resistors in a series connection of the first to the r-th resistor is the same as a number of resistors in a series connection of the (r+1)-th to the k-th resistor.

8. The ladder resistor circuit according to claim 1, wherein the amplifier is connected between a k/2-th resistor and a (k/2+1)-th resistor.

9. The ladder resistor circuit according to claim 1, wherein each of the first correction resistor and the second correction resistor is a fixed resistor.

10. The ladder resistor circuit according to claim 9, wherein each of the first to k-th resistors is a fixed resistor.

11. The ladder resistor circuit according to claim 1, wherein the amplifier is connected to the same node.

12. The ladder resistor circuit according to claim 1, wherein the same node is between a k/2-th resistor and a (k/2+1)-th resistor of the first to k-th resistors.

* * * * *